United States Patent [19]

Shepard, Jr. et al.

[11] Patent Number: 4,999,264

[45] Date of Patent: Mar. 12, 1991

[54] AQUEOUS ELECTROCHEMICAL CELL

[75] Inventors: Vance R. Shepard, Jr., Hubbardston, Mass.; Michelle Wolf, Overland Park, Kans.

[73] Assignee: Duracell Inc., Bethel, Conn.

[21] Appl. No.: 440,954

[22] Filed: Nov. 24, 1989

[51] Int. Cl.⁵ .............................................. H01M 2/08
[52] U.S. Cl. .................... 429/171; 429/173; 429/174; 429/224
[58] Field of Search ............... 429/86, 89, 171, 173, 429/174, 185, 163–165, 167, 134, 135, 224, 206

[56] References Cited

U.S. PATENT DOCUMENTS

| | | | |
|---|---|---|---|
| 1,196,611 | 8/1916 | Tassin | 429/165 |
| 1,657,543 | 1/1928 | Lynn | 429/165 |
| 3,255,049 | 6/1966 | Wolfe | 429/166 X |
| 3,506,495 | 4/1970 | Reilly et al. | 429/86 |
| 3,663,301 | 5/1972 | Ralston et al. | 429/165 X |
| 4,011,044 | 1/1977 | Miyoshi et al. | 429/166 |

FOREIGN PATENT DOCUMENTS 55-28249  2/1980  Japan.

Primary Examiner—Anthony Skapars
Attorney, Agent, or Firm—Ronald S. Cornell; James B. McVeigh, Jr.

[57] ABSTRACT

The present invention relates to the use of a gelling agent between the plastic seal and the outer cover of an electrochemical cell.

12 Claims, 1 Drawing Sheet

AQUEOUS ELECTROCHEMICAL CELL

This invention relates to aqueous electrochemical cells, and in particular relates to a means, located externally to the cell's internal sealed compartment, for entrapping electrolyte which might escape from the sealed internal compartment.

Commercially available alkaline cells do not leak under normal use conditions do not leak. However, if cells are subjected to extreme environmental stresses (such as repeated extreme temperature cycling over short time periods) it is possible that the seals could be deleteriously affected, leading to leakage of electrolyte. In the event that such leakage occurred, the electrolyte could damage the equipment which contained the cells.

In accordance with the present invention, means to retain any electrolyte which may escape past the seal is provided external to the seal and internal to an outer metallic cover. It is preferred that the electrolyte retaining means is not externally accessible to the user or to components of the device being operated. The result is that the electrolyte, which is corrosive to some materials, is kept from contacting any external surfaces of the cell.

In particular, the present invention comprises a washer shaped disc comprising a gelling agent that is disposed in the top assembly of a cell external to the seal. A typical top assembly for a cylindrical alkaline cell is comprised of a plastic seal member, a metal support member, and an outer metallic end cap. The plastic seal member fits snugly in the open end of a cell casing. The metal support member is located on the upper surface of the seal member and provides mechanical support to the seal member during crimping. The outer metallic end cap is electrically connected to an anode current collector whereby the end cap functions as the negative terminal of the cell. In one embodiment of the present invention the washer is located on top of the metal support member. The outer metallic end cap is disposed over the plastic sealing member whereby the washer is located between the support member and the end cap. In a preferred embodiment, the washer is adapted to substantially fill the space between the support member and the end cap.

A common design for alkaline cells also has an anode conductor located through the center of the sealing member. Therefore, two leakage paths are available; one path is between the sealing member and the cell casing and the second path is between the anode conductor and the sealing member. The present invention is capable of retaining leakage from both paths. Thus, in the event that any electrolyte leaks out of the inner container by either path, the gelling agent readily absorbs the electrolyte and prevents it from creeping to the outer surface of the outer metallic cover.

As used herein the term "gelling agent" is intended to include conventional gelling agents as well as superabsorbants. Conventional gelling agents include polyacrylic acid, polyacrylate, carboxymethyl cellulose, and the like. Examples of superabsorbant, which actually absorb liquid and can absorb up to 1000 times their weight of water, are starch graft copolymers. U.S. Pat. Nos. 4,435,488; 4,455,358; and 4,563,404 disclose gelling agents of the type contemplated for use herein and the teachings of these patents are incorporated herein by reference.

Efforts have previously been made to employ a substance which reacts chemically with the electrolyte exterior to the seal. Such an approach is taught by U.S. Pat. No. 4,258,108. A problem with the use of substances which react chemically is that the reaction product is often only slightly less corrosive than the electrolyte. The less corrosive reaction products can still creep to the exterior of the cell because there is no retention or trapping characteristic to these substances. As a result it becomes necessary, with the chemically reacting expedients, to use a lacquer or other suitable sealant to retain the chemicals. However, lacquers or coatings are also susceptible to leakage and can be peeled away.

The features and advantages of the present invention will now be discussed with reference to the accompanying Figures in which.

Figure 1:
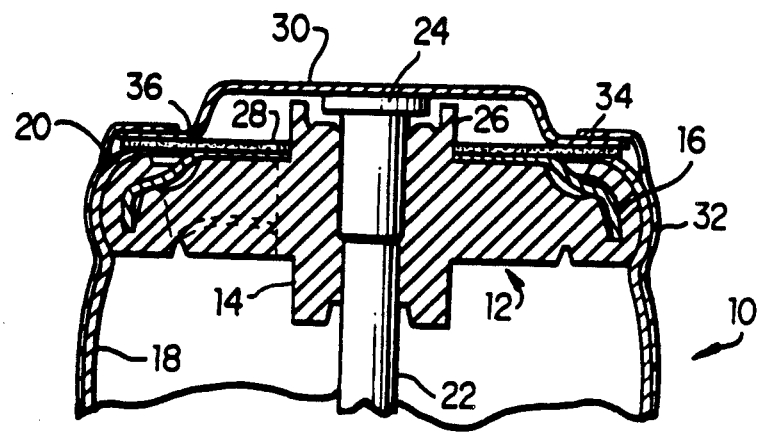
FIG. 1 is a cross-sectional view through the upper portion of an electrochemical cell having a washer comprising a gel in accordance with the present invention.

In reference to FIG. 1 there is shown an electrochemical cell 10 having a plastic seal 12. Seal 12 comprises a plastic member 14 and a metal support 16 integrally associated therewith. The upper end 20 of the cell casing 18 is crimped inwardly to tightly engage seal 12. A nail-type anode conductor 22 extends through a central boss portion 26 of seal 12, and an outer metallic cup-shaped cover 30 engages the head of the anode conductor whereby said cover functions as the external anode contact of the cell. A cylinder of heat shrinkable material 32 is placed around the cell casing 18. After shrinking, a portion 34 of the material 32 overlaps the outer metallic cover as shown. Portion 34 acts to hold the peripheral flange portion 36 of the outer metallic cover 30 tightly against washer 28.

According to the present invention, a washer 28 comprising the gelling agent is located on top of the metal support member 16. Washer 28 fits closely over boss portion 26 and has an outer diameter sufficiently large to overlap the crimped edge 20 of the cell casing 18.

As shown in FIG. 1, the outer metallic cover 30 preferably has a diameter slightly greater than the diameter of washer 28. Accordingly, if electrolyte leaks from between seal 12 and cell casing 20 it would contact disc 28 and be absorbed thereby. If electrolyte was to leak from the alternative possible path between nail 22 and plastic member 14 it would still contact disc 28 and be absorbed thereby.

Washer 28 may consist essentially of the gelling agent material which has been pressed sufficiently so as to be molded into a unitary article. Additionally small amounts of binder or alkaline resistant adhesive can be added to enhance the cohesiveness of the gelling agent particles. In a preferred embodiment, washer 28 comprises at least one substrate layer and at least one gelling agent layer. The substrate layer can be made from any non-conductive material which does not degrade in the presence of the alkaline electrolyte. Suitable materials include non-woven sheets of polypropylene, polyvinyl alcohol, polyethylene, rayon, tissue and the like. The sheet thickness should be between about 2 and 15 mils, and preferably between 3 and 7 mils.

In one embodiment the washer is comprised of one layer of substrate material and one layer of gelling agent. A method for making such embodiment involves applying a uniform layer of the gelling agent powder onto one side of the substrate material. These are then passed through compression rollers to compress the layers sufficiently so that the gelling agent powder becomes fixed onto the surface of the substrate. The washers can then be punched from the sheet using a die or other appropriate cutting tool.

Figure 4:
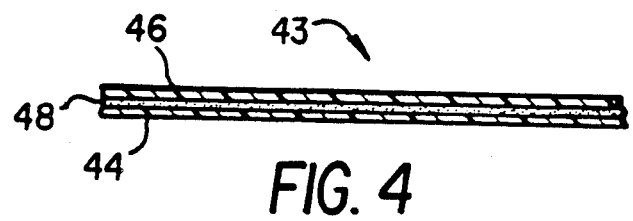
FIG. 4 is a cross sectional view through a laminated structure which can be used to fabricate washers for use in accordance with the present invention.

A second procedure for making the washer i similar to that described above with the addition of a second layer of substrate material being placed on top of the gelling agent powder layer. Surprisingly, despite the gelling agent being in the middle of this "sandwich" it is still effective to retain any leakage. Referring now to FIG. 4 there is shown a three layer laminate 43. The laminate is comprised of a first layer of substrate 44, a second layer of substrate 46, and a gelling agent layer 48 sandwiched therebetween. The three layers are passed between compression layers to form a composite sheet. Washers can then be cut from the formed sheet. Similarly a multi-layer structure can be made having multiple layers of gelling agent and multiple layers of substrate material.

Alternatively, the washer can be made from a highly porous material such as a non-woven fibrous mat made from fibers of the substrate materials listed above. The gelling agent powder can be dispersed throughout the mat such that a homogeneous distribution of the gelling agent powder is obtained.

Figure 2:
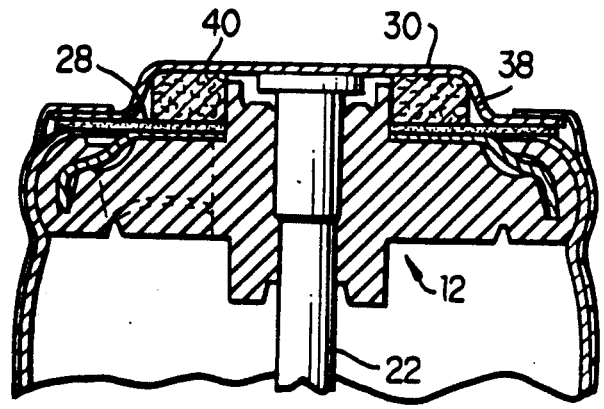
FIG. 2 is a cross-sectional view through the upper portion of an electrochemical cell wherein two washers are located in the top of the cell.

FIG. 2 shows a second embodiment of the present invention wherein a second washer comprising gelling agent 40 is employed. The inner diameter of washer 40 is the same as the inner diameter of washer 28 so that a snug fit is obtained with boss 26. The outer diameter of washer 40 is less than that of washer 28 so that washer 40 can have a thickness which will substantially fill the cup portion 38 of outer metallic cover 30 as shown in FIG. 2. The primary function of washer 40 is to contain any leakage passing between nail 22 and plastic sealing member 12.

As discussed above, washer 40 can be a multilaminate structure having alternating layers of gelling agent and substrate material. Alternatively, washer can be made from a porous non-woven fibrous mat having gelling agent distributed throughout. While FIG. 2 shows washers 28 and 40 as discrete elements, they could also be fabricated as a unitary article which would reduce the number of parts and simplify manufacture.

Figure 3:
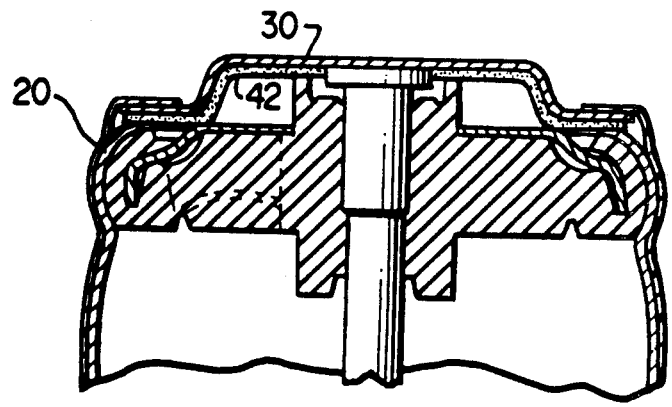
FIG. 3 is a cross-sectional view through the upper portion of an electrochemical cell having another embodiment of the present invention.

A third embodiment of the present invention is shown in FIG. 3. The washer 42 comprising gelling agent is shaped to conform along the inner surface of outer metallic cover 30. A washer made as described above can be thermoformed to conform to the contours of the inner surface of cover 30. In this embodiment, it would be preferred to use a washer 42 having a single layer of substrate and a single layer of gelling agent. The washer 42 would be located with the plastic substrate layer against the inside surface of outer metallic cover 30. Since many of the substrate materials listed above are thermoformable the substrate layer will adhere to the inside surface if moderate heat is applied.

It is clear that a variety of combinations of substrate thickness and gelling agent thickness are possible. The only real limitation is the amount of head room available in the top region of the cell. as can be seen from FIG. 1 the thickness of the washer contributes to the height of the cell. The compression force necessary to form the composite washer depends on the choice of substrate material and thickness as well as the thickness of the gelling agent layer.

Comparative test results of cells ( zinc-manganese dioxide, AA size, alkaline cells) embodying this invention, deliberately built with defective seals at the crimp, show a 58% reduction in the number of cells having visual signs of leakage on the outer metallic cover when built according to the present invention as compared to cells having a washer with no gelling agent.

Various changes and modifications can be made to the embodiments described herein without departing from the scope of the present invention as set forth in the following claims.

What is claimed is:

1. An electrochemical cell having a zinc anode, a manganese dioxide cathode, a separator, and an alkaline electrolyte, all in operative association with one another and contained within an open ended cylindrical cell casing, said cell further comprising a plastic seal disposed in the open end of the cell casing; an inwardly directed crimp formed around the upper end of the cell casing; a metallic anode conductor extending substantially through the plastic seal member and into the anode; an outer, metallic cover having a cup-shaped portion, said cover being electrically connected to an external end of the anode conductor and said cover being disposed over the seal; and at least one annular member comprising a gelling agent disposed between the seal and the outer metallic cover.

2. The electrochemical cell of claim 1 wherein said annular member comprises a first washer having an outer diameter greater than the diameter of the inwardly directed crimp and slightly less than the diameter of the metallic cover such that the outer periphery of the annular member is sandwiched between the crimp and the outer periphery of the metallic cover.

3. The electrochemical cell of claim 1 wherein said annular member comprises a washer having an outer diameter slightly less than the diameter of the cup-shaped portion of the metallic cover, with said washer resting within said cup-shaped portion.

4. The electrochemical cell of claim 3 wherein said metallic cover comprises a peripheral flange extending outwardly from said cup shaped portion.

5. The electrochemical cell of claim 1 wherein said annular member comprises a first washer having an outer diameter greater than the diameter of the inwardly directed crimp and slightly less than the diameter of the metallic cover such that the outer periphery of the annular member is sandwiched between the crimp and the outer periphery of the metallic cover, and a second washer having an outer diameter slightly less than the diameter of the cup-shaped portion of the metallic cover such that the second annular member substantially fills the internal void of said cup portion.

6. The electrochemical cell of claim 5 wherein said first and second washers are unitary.

7. The electrochemical cell of claim 1 wherein said washer has an outer diameter greater than the diameter of the inwardly directed crimp and slightly less than the diameter of the metallic cover such that the outer periphery of the annular member is sandwiched between the crimp and the outer periphery of the metallic cover, and wherein said washer conforms to and is located against the inside surface of the metallic cover.

8. The electrochemical cell of claim 1 further comprising a metal support member engaged with the upper surface of the plastic seal wherein the void space between the cup shaped metallic cover and the metal support member is substantially filled by the annular shaped member.

9. The electrochemical cell of claim 1 wherein said annular member is a composite comprising a layer of gelling agent and at least one layer of a non-woven polymeric material.

10. The electrochemical cell of claim 1 wherein said annular member comprises two layers of a non-woven polymeric material with a layer of gelling agent therebetween.

11. The electrochemical cell of claim 11 wherein the gelling agent is selected from the group consisting of polyacrylic acid, polyacrylonitrile, starch graft copolymers, carboxymethyl cellulose and mixtures thereof.

12. The electrochemical cell of claim 9 wherein said non-woven polymeric material is selected from the group consisting of nonwoven polypropylene, polyethylene, polyvinyl alcohol, rayon, tissue and mixtures thereof.

* * * * *